United States Patent [19]

Nakayama et al.

[11] Patent Number: 4,707,411

[45] Date of Patent: Nov. 17, 1987

[54] MAGNETIC PAINT FOR MAGNETIC RECORDING MEDIA

[75] Inventors: Akira Nakayama, Yokosuka; Katsuya Nakamura, Tokyo; Kotaro Hata, Ichikawa; Makoto Yamamoto, Hiratsuka, all of Japan

[73] Assignee: Nippon Zeon Co., Ltd., Tokyo, Japan

[21] Appl. No.: 733,269

[22] Filed: May 13, 1985

[30] Foreign Application Priority Data

| May 11, 1984 [JP] | Japan | 59-93011 |
| May 11, 1984 [JP] | Japan | 59-93012 |
| May 11, 1984 [JP] | Japan | 59-93013 |
| Aug. 22, 1984 [JP] | Japan | 59-174399 |

[51] Int. Cl.$^4$ ............................................. G11B 5/702
[52] U.S. Cl. ................................ 428/413; 252/62.54; 427/128; 428/522; 428/694; 428/900
[58] Field of Search ............... 428/694, 328, 329, 900, 428/425.9, 522, 413; 252/62.54; 360/134–136; 427/128

[56] References Cited

U.S. PATENT DOCUMENTS

| 4,368,237 | 1/1983 | Yamada | 428/425.9 |
| 4,520,079 | 5/1985 | Nakajima | 428/900 |
| 4,529,661 | 7/1985 | Ninomiya | 428/900 |
| 4,562,117 | 12/1985 | Kikukawa | 252/62.54 |
| 4,594,174 | 6/1986 | Nakayama | 428/900 |
| 4,600,521 | 7/1986 | Nakamura | 428/900 |
| 4,613,545 | 9/1986 | Chubachi | 428/900 |

*Primary Examiner*—Ellis P. Robinson
*Attorney, Agent, or Firm*—Sherman and Shalloway

[57] ABSTRACT

A magnetic paint for magnetic recording media, comprising a magnetic powder and as a binder therefor, a copolymer resin containing 0.5 to 10% by weight of epoxy groups and 0.1 to 4.0% by weight of sulfur- or phosphorus-containing strong acid groups and having a vinyl chloride unit content of at least 60% by weight.

24 Claims, No Drawings

MAGNETIC PAINT FOR MAGNETIC RECORDING MEDIA

This invention relates to a magnetic paint for magnetic recording media.

Magnetic recording media such as magnetic tapes or cards are generally produced by coating a magnetic paint comprising a magnetic powder and a binder on a substrate such as a polyester film to form a magnetic layer thereon. In recent years, finely divided magnetic metal powders having a high specific surface area have come into use as such a magnetic powder in an attempt to increase coercivity, maximum saturation magnetization, SN ratios and recording density.

Since the magnetic metal powders have high surface activity, the use of ordinary binders such as a vinyl chloride/vinyl acetate/vinyl alcohol terpolymer, a vinyl chloride, vinyl acetate/maleic acid terpolymer, or nitrocellulose leads to the disadvantage that a magnetic paint containing the magnetic metal powder is gelled during preparation, or the magnetic metal powders have insufficient dispersibility. In magnetic paints, a low-molecular-weight surface-active agent is used as a dispersant in order to improve the dispersibility of the magnetic powder. The amount of the dispersant that can be used is limited because when used in large amounts, it will reduce the durability of the resulting magnetic recording medium or cause contamination of a recording head.

On the other hand, in order to increase the durability and reliability of magnetic recording media, attempts are generally made, especially in the production of magnetic videotapes, to crosslink the magnetic layer by adding a flexible material such as a polyurethane resin, a polyester resin or acrylonitrile/butadiene rubber and a crosslinking agent which reacts with a part or the whole of the binder. The binder is therefore required to be compatible with the flexible material and have proper reactivity with the crosslinking agent. The binder is further required in view of the necessity of increasing the reliability of magnetic tapes to have excellent chemical stability and the freedom from generation of decomposition products which will degrade the magnetic powder or cause corrosion of the recording head.

The present inventors have made extensive investigations in order to develop a binder which can meet the higher performance of magnetic recording media, and have found that the use of a specified vinyl chloride resin can give a magnetic paint which maintains high dispersibility, is free from gellation, and has excellent reactivity with crosslinking agents and heat stability, and that a magnetic recording medium obtained by using this magnetic paint has good film surface smoothness and durability and excellent running property, magnetic properties and electromagnetic converting characteristics.

According to this invention, there is provided a magnetic paint for magnetic recording media, said paint comprising a magnetic powder and as a binder therefor, a copolymer resin containing 0.5 to 10% by weight of epoxy groups and 0.1 to 4.0% by weight of sulfur- or phosphorus-containing strong acid groups and having a vinyl chloride unit content of at least 60% by weight.

The copolymer resin used in this invention may be obtained by any desired methods. The following resins (I), (II), (III) and (IV) are produced by typical methods which will be described below successively.

(I) A resin resulting from addition reaction of an alkali metal salt or an ammonium salt of a sulfur- or phosphorus-containing strong acid with a copolymer having a vinyl chloride unit content of at least 60% by weight obtained by copolymerizing vinyl chloride and a monomer having an epoxy group and as required another monomer copolymerizable with these monomers is one example of the copolymer resin that can be used in this invention.

Production of the resin (I) starts from an epoxy group-containing copolymer obtained by copolymerizing vinyl chloride and a monomer containing an epoxy group and as required, another monomer copolymerizable with these monomers. Since the epoxy group-containing copolymer can be produced by any of known methods, the most suitable one may be selected from them according to the conditions of the subsequent addition-reaction or the properties of the final resin. For example, when it is desired to carry out the addition-reaction in an aqueous medium, the copolymer can be conveniently obtained as fine dispersed particles in aqueous medium by emulsion polymerization. When the additionreaction is desired to be carried out in a solvent system, the copolymer is preferably prepared by solution polymerization, or by suspension polymerization using a lower alcohol typified by methanol as a polymerization medium. The ordinary suspension polymerization process may also be employed.

Examples of polymerization initiators which may be used in the production of the copolymer include organic peroxides such as lauroyl peroxide, benzoyl peroxide, 3,5,5-trimethylhexanoyl peroxide, diisopropyl peroxydicarbonate, di-2-ethylhexyl peroxydicarbonate, di-2-ethoxyethyl peroxydicarbonate, t-butyl peroxypivalate and t-butyl peroxyneodecanoate; azo compounds such as 2,2'-azobisisobutyronitrile, 2,2'-azobis-2,4-dimethylvaleronitrile and 4,4'-azobis-4-cyanovalerate; and inorganic peroxides such as ammonium persulfate, potassium persulfate and ammonium perphosphate. Redox initiator systems comprising a combination of peroxides such as hydrogen peroxide, cumene hydroperoxide and t-butyl hydroperoxide and reducing agents such as sodium formaldehydesulfoxylate, sodium sulfite, sodium thiosulfate and ascorbic acid are also advantageously used in the emulsion polymerization system.

Suspension stabilizers that may be used in the production of the copolymer resin include, for example, polyvinyl alcohol and a partially saponified product of polyvinyl acetate; cellulose derivatives such as methyl cellulose, hydroxypropyl cellulose and carboxymethyl cellulose; synthetic polymers such as polyvinyl pyrrolidone, polyacrylamide, maleic acid/styrene copolymer, maleic acid/methyl vinyl ether copolymer and maleic acid/vinyl acetate copolymer; and natural polymers such as starch and gelatin.

Suitable emulsifiers that may be used in the production of the copolymer include, for example, anionic emulsifiers such as sodium alkylbenzenesulfonates or sodium laurylsulfate, and nonionic emulsifiers such as polyoxyethylene alkyl ethers and partial esters of polyoxyethylene sorbitan fatty acids.

As required, molecular weight controlling agents such as trichloroethylene or thioglycol may be used in the polymerization process.

Examples of the monomer having an epoxy group used in the preparation of the epoxy group-copolymer include glycidyl ethers of unsaturated alcohols such as allyl glycidyl ether and methallyl glycidyl ether; glycidyl esters of unsaturated acids such as glycidyl acrylate, glycidyl methacrylate, glycidyl p-vinylbenzoate, methyl glycidyl itaconate, glycidyl ethylmaleate, glycidyl vinylsulfonate and glycidyl (meth)allylsulfonate; and epoxide olefins such as butadiene monoxide, vinylcyclohexene monoxide and 2-methyl-5,6-epoxyhexene.

The epoxy group-containing monomer is used generally in such an amount that the proportion of epoxy groups in the copolymer is within the range of 0.5 to 10% by weight. If this proportion is less than 0.5% by weight, the subsequent addition-reaction proceeds with difficulty, and the selection of the reaction conditions is difficult.

Examples of the other monomer optionally used in addition to vinyl chloride and the epoxy group-containing monomer as essential ingredients include vinyl esters of carboxylic acids such as vinyl acetate and vinyl propionate; vinyl ethers such as methyl vinyl ether, isobutyl vinyl ether and cetyl vinyl ether; vinylidene halides such as vinylidene chloride and vinylidene fluoride; unsaturated carboxylic acids such as acrylic acid, methacrylic acid, maleic acid and itaconic acid; unsaturated carboxylic acid anhydrides such as maleic anhydride; esters of unsaturated carboxylic acids such as diethyl maleate, butylbenzyl maleate, dimethyl itaconate, methyl (meth)acrylate, ethyl (meth)acrylate and lauryl (meth)acrylate; olefins such as ethylene and propylene; unsaturated nitriles such as (meth)acrylonitrile; and aromatic vinyl compounds such as styrene, alpha-methylstyrene and p-methylstyrene. These monomers are properly chosen in order to increase the solubility of a mixture of the resin of this invention with another resin while regulating the compatibility of these resins with each other and their softening points, or to improve the properties of the coated film or the coating process.

The amount of the other monomer is such that the proportion of units derived from this monomer is not more than 35% by weight in the copolymer.

The aforesaid polymerization initiator, the suspending agent, the emulsifier, the molecular weight controlling agent, vinyl chloride, the epoxy group-containing monomer and the other monomer may be added at a time at the start of polymerization, or portionwise during the polymerization. The polymerization is usually carried out at a temperature of 35° to 80° C. with stirring.

The resin (I) in accordance with this invention is obtained by the addition-reaction of the resulting epoxy group-containing copolymer with an alkali metal salt or an ammonium salt of a sulfur- or phosphorus-containing strong acid.

Examples of the alkali metal salt or ammonium salt of a sulfur- or phosphorus-containing strong acid include sulfites such as sodium sulfite, sodium bisulfite, ammonium sulfite and potassium sulfite; bisulfates such as sodium hydrogen sulfate, potassium hydrogen sulfate and ammonium hydrogen sulfate; phosphoric acid hydrogen salts such as dipotassium hydrogen phosphate and disodium hydrogen phosphate; phosphites such as sodium hydrogen phosphite and ammonium hydrogen phosphite; aminosulfonic acid salts such as sodium taurine, sodium sulfamate and potassium sulfanilate; and aminosulfates such as sodium 1-aminoethylsulfate.

The addition reaction can be carried out either in an aqueous medium or a non-aqueous medium. Since the above salts used in the addition-reaction are water-soluble, it is preferred to carry it out in an aqueous medium or in a water-containing organic solvent medium. The reaction is carried out with stirring usually at a temperature of 40° to 12° C. for 2 to 24 hours. If the reaction temperature is too high, the resin will undergo degradation. Catalysts may be used to promote the addition reaction. Examples of the catalysts are quaternary ammonium salts such as tetrabutyl ammonium bisulfate, tetrabutyl ammonium bromide, trimethyl lauryl ammonium chloride and benzyl triethyl ammonium chloride; and boron fluorides such as zinc boron tetrafluoride.

The addition reaction may also be carried out simultaneously with the polymerization by carrying out the polymerization of preparing the epoxy group-containing copolymer in the presence of the salt and catalyst required for the addition reaction.

(II) A copolymer resin obtained by polymerizing vinyl chloride, the epoxy group-containing monomer and as required the other monomer copolymerizable with them in the presence of a radical initiator having a sulfur- or phosphorus-containing strong acid group is another example of the copolymer resin used in this invention.

The resin (II) is obtained by polymerizing vinyl chloride, the epoxy group-containing monomer, optionally the other monomer copolymerizable with them, the radical intiator having a sulfur- or phosphorus-containing strong acid group, for example an alkali metal salt or ammonium salt of persulfuric acid such a ammonium persulfate and potassium persulfate, and an alkali metal salt or ammonium salt of perphosphoric acid such as ammonium perphosphate and sodium perphosphate. The amount of the radical initiator used is usually 0.3 to 9.0% by weight, preferably 1.0 to 5.0% by weight.

The resin (II) may be produced by any of known methods. Since many radical initiators having a sulfur- or phosphorus-containing strong acid group are water-soluble, the resin (II) is conveniently produced by emulsion polymerization, or by suspension polymerization using a lower alcohol typified by methanol as a polymerization medium. Solution polymerization in a ketone solvent is also a preferred method.

In the production of the resin (II), the same polymerization initiators as used normally in the polymerization of vinyl chloride and exemplified above with regard to the production of the resin (I) may be used in addition to the radical initiator having a sulfur- or phosphorus-containing strong acid group.

The radical initiator having the strong acid group may be used in combination with a reducing agent such as sodium formaldehydesulfoxylate, sodium sulfite or sodium thiosulfate.

The same suspension stabilizer, emulsifier and molecular weight controlling agent as exemplified with regard to the resin (I) may be used.

Examples of the epoxy group-containing monomer used in the production of the resin (II) are the same as those given with regard to the resin (I). This monomer is used generally in such an amount that the proportion of the epoxy groups in the resulting copolymer resin is within the range of 0.5 to 10% by weight. If this proportion is less than 0.5% by weight, it is difficult to select conditions for introducing the strong acid group.

The types of the other monomer which may be optionally used in addition to vinyl chloride and the epoxy group, the method of adding the monomers and the other chemicals, and the polymerization temperature are also the same as described hereinabove with regard to the production of the resin (I).

(III) A copolymer resin obtained by copolymerizing vinyl chloride, a monomer containing a group derived from an alkali metal salt or ammonium salt of a sulfur- or phosphorus-containing strong acid, an epoxy group-containing monomer and optionally another monomer copolymerizable with these monomers is still another example of the copolymer resin that can be used in this invention.

The resin (III) can be produced by polymerizing vinyl chloride, a radical-polymerizable monomer having a group derived from an alkali metal salt or ammonium salt of a sulfur- or phosphorus-containing strong acid, an epoxy group-containing monomer and optionally another monomer copolymerized with these monomers in the presence of a polymerization initiator.

Sulfonic acid salts are most readily available and many in kind as the radical polymerizable monomer. Specific examples include alkali metal salts or ammonium salts of sulfonic acids such as vinylsulfonic acid, methylvinylsulfonic acid, (meth)allylsulfonic acid, styrenesulfonic acid, (meth)acrylic acid-ethyl 2-sulfonate, 2-acrylamide-2-methylpropanesulfonic acid and 3-allyloxy-2-hydroxypropanesulfonic acid. As monomers having a group derived from a sulfuric acid salt, there may be cited alkali metal salts or ammonium salts of such compounds as (meth)acrylic acid-ethyl 2-sulfate and 3-allyloxy-2-hydroxypropanesulfuric acid. As monomers having a group derived from a phosphoric acid salt, there may be cited alkali metal salts or ammonium salts of (meth)acrylic acid-propyl 3-chloro-2-phosphate, (meth)acrylic acid-ethyl 2-phosphate and 3-allyloxy-2-hydroxypropanephosphoric acid. Monomers having a group derived from a phosphonic acid salt may also be cited, and specific examples include alkali metal salts or ammonium salts of vinylphosphonic acid, acrylamidemethanephosphonic acid, ethyl 2-phosphonate-(meth)acrylate, and 3-allyloxy-2-hydroxypropanephosphonate. The above radical-polymerizable monomer is used in such an amount that the proportion of the strong acid groups in the resulting copolymer is 0.1 to 4.0% by weight, preferably 0.3 to 2.0% by weight, as $SO_3$, $SO_4$, $PO_4$, $PO_3$, etc.

Examples of the epoxy group-containing monomer used in the production of the resin (II) are the same as those given above with regard to the resin (I). This monomer is used generally in such an amount that the proportion of the epoxy groups in the copolymer is within the range of 0.5 to 10% by weight. If this proportion is less than 0.5% by weight, the heat stability or crosslinkability of the resulting resin are reduced.

Examples of the other monomer which can be used in the production of the resin (III) may be the same as those given above with regard to the production of the resin (I).

The resin (III) may be produced by any of known polymerization methods. In view of the solubility of the polymer, it is preferably produced by solution polymerization or by a suspension polymerization process using a lower alcohol such as methanol or ethanol either alone or in combination with deionized water.

The polymerization chemicals and other polymerization procedures are the same as described hereinabove with regard to the resin (I).

(IV) A resin obtained by polymerizing an addition-reaction mixture of an epoxy group-containing monomer with an alkali metal salt or ammonium salt of a sulfur- or phosphorus-containing strong acid, vinyl chloride and as required, another monomer copolymerizable with these monomers is yet another example of the copolymer resin used in this invention.

The addition reaction between the epoxy group-containing monomer and the alkali metal salt or ammonium salt of a sufur- or phosphorus-containing strong acid is carried out usually with stirring at room temperature or elevated temperatures. Examples of the epoxy group-containing monomer and the aforesaid alkali metal or ammonium metal are the same as those given hereinabove with regard to the resin (I).

The addition-reaction may be carried out either in an aqueous medium or in a non-aqueous medium. Since the aforesaid salts used in the addition-reaction are water-soluble, it is advantageously carried out in an aqueous medium or a water-containing organic solvent medium. The reaction is carried out usually at about 20° to 120° C. for 1 to 24 hours with stirring. Too high reaction temperatures may induce increased degrees of side-reactions. The epoxy group content of the final resin is adjusted to 0.5 to 10% by weight by performing the reaction in such a manner as to leave the unreacted epoxy group-containing monomer. Catalysts may be used to promote the addition reaction. Examples of such catalysts include quaternary ammonium salts such as tetrabutyl ammonium bisulfate, tetrabutyl ammonium bromide, trimethyl lauryl ammonium chloride and benzyl triethyl ammonium chloride; and boron fluorides such as zinc boron tetrafluoride.

The resulting reaction mixture, either as such or after removing the inorganic salts or the addition-reaction catalyst, is copolymerized with vinyl chloride and as required the other copolymerizable monomer in the presence of a radical initiator.

Examples of the other monomer which can optionally be used are the same as those given above in regard to the resin (I).

The resin (IV) may be produced by any of known polymerization methods. From the standpoint of the solubility of the polymer, it is preferable to employ a solution polymerization process, or a suspension polymerization process using a lower alcohol such as methanol or ethanol either alone or in combination with deionized water. An emulsion polymerization method may also be employed.

The polymerization chemicals and other polymerization procedures may be the same as those described above with regard to the resin (I).

The resins used in this invention which are obtained as described above have an average degree of polymerization of 100 to 900, preferably 200 to 500, and a vinyl chloride unit content of at least 60% by weight. If the degree of polymerization is less than 100, the resulting magnetic layer has insufficient abrasion resistance. If it exceeds 900, the viscosity of the paint is high, and dispersion of a magnetic powder in it tends to be insufficient. If the vinyl chloride unit content is less than 60% by weight, the compatibility of the resin with a flexible material is reduced, or the separation of the solvent from the coated film is markedly reduced.

It is necessary that the amount of the strong acid groups bonded to the resin should be 0.1 to 4.0% by weight as $-SO_3$, $-SO_4$, $-PO_4$, $-PO_3$, etc. If it is less than 0.1% by weight, the dispersibility of the magnetic powder is insufficient. If it exceeds 4.0% by weight, the hydrophilicity of the strong acid groups becomes strong, and the solubility of the resin in solvents becomes insufficient. Moreover, the resulting coated film has reduced moisture resistance, or the magnetic powder undergoes flocculation to reduce its dispersibility.

The resin used in this invention, as in the case of ordinary vinyl chloride resin binders for magnetic paints, is prepared as a solution in a solvent together with a flexible material such as a polyurethane resin, polyester resin or acrylonitrile-butadiene copolymer, a crosslinking agent typified by polyisocyanates, and a magnetic powder, and as required, other known materials such as a lubricant, a dispersant, an antistatic agent and an abrasive agent.

Since a magnetic coated film obtained by using the resin in accordance with this invention can exhibit excellent heat stability owing to the residual epoxy groups, it permits the production of a magnetic recording medium which has excellent reliability and does not easily corrode a recording head. Moreover, by utilizing the reactivity of the epoxy groups, the coated film can be crosslinked with a polyamine compound or a polycarboxylic acid compound. The use of these crosslinking agents on the resin used in this invention induces crosslinking very effectively at a faster rate of crosslinking than on ordinary epoxy group-containing vinyl chloride copolymers having no strong acid group. The reason for this is not clear, but it is presumed that the strong acid groups bonded to the resin have an accelerating action.

If desired, the resin in accordance with this invention may be used in combination with an ordinary resin binder for magnetic paints, such as vinyl chloride/vinyl acetate copolymer resin, vinyl chloride/vinyl alcohol/vinyl acetate copolymer resin, a cellulosic resin, a phenoxy resin, an amino resin, an epoxy resin, a butyral resin and an acrylic resin within the range in which the purpose of this invention can be achieved.

Magnetic metallic powders such as Fe and Co powders are preferred as the magnetic powder, but iron oxide powders such as gamma-$Fe_2O_3$, $Fe_3O_4$, Co-containing gamma-$Fe_2O_3$, Co-containing $Fe_3O_4$ and barium ferrite and $CrO_2$ powder may also be used.

The following examples illustrate the present invention specifically. All parts in these examples are by weight.

[Examples of synthesizing resin (I)]

EXAMPLE 1

An autoclave was charged with 8 parts of allyl glycidyl ether, 6 parts of vinyl acetate, 3 parts of sodium laurylsulfate, 2 parts of t-butyl hydroperoxide, 1 part of sodium sulfite, 1.5 parts of sodium hydroxide and 300 parts of deionized water. After deaeration, 100 parts of vinyl chloride was introduced and the polymerization was started at 55° C. When the pressure of the autoclave reached 3 kg/cm$^2$, the unreacted vinyl chloride was recovered. The polymer solution was divided into three portions. One portion (75 parts) of the polymer emulsion was mixed with 5 parts of sodium sulfite, 2.5 parts of tetrabutyl ammonium bromide and 5 parts of ethylene glycol dimethyl ether with stirring at 70° C. for 6 hours. The mixture was frozen and coagulated, washed with water, and dried to give a resin (I-A).

EXAMPLE 2

Another portion (75 parts) of the polymer emulsion prepared in Example 1 was worked up as in Example 1 except that dipotassium hydrogen phosphate was used instead of sodium bisulfite to give a resin (I-B).

COMPARATIVE EXAMPLE 1

The remaining portion (75 parts) of the polymer emulsion prepared in Example 1 was directly frozen and coagulated, washed with water, and dried to give a resin (I-C).

EXAMPLE 3

An autoclave was charged with 2 parts of vinyl acetate, 180 parts of acetone, 1.5 parts of 2,2'-azobisisobutyronitrile and 1.0 part of sodium bicarbonate. After deaeration, 100 parts of vinyl chloride was introduced, and the polymerization was started at 55° C. Immediately then, the continuous introduction of a mixture of 25 parts of glycidyl methacrylate and 75 parts of methanol was started, and all of it was added before the pressure of the autoclave reached 2.0 kg/cm$^2$. When the pressure reached 1.0 kg/cm$^2$, the unreacted vinyl chloride was recovered.

The polymer solution was divided into three portions. One portion (75 parts) was mixed with shaking with 5 parts of taurin sodium and 45 parts of deionized water. Deionized water (200 parts) was further added to separate the resin. The resin was dried to give a resin (I-D).

EXAMPLE 4

Another portion (75 parts) of the polymer solution prepared in Example 3 was mixed with shaking with 4 parts of ammonium hydrogen sulfate, 1 part of potassium sulfite and 45 parts of deionized water. Sodium hydroxide (10 parts) was further added and mixed for 2 hours. Deionized water (200 parts) was added to separate the resin. It was dried to give a final resin (I-E).

COMPARATIVE EXAMPLE 2

Deionized water (200 parts) was added to the remaining portion (75 parts) of polymer solution prepared in Example 3 to separate the resin. It was dried to give a final resin (I-F).

EXAMPLE 5

An autoclave was charged with 15 parts of allyl glycidyl ether, 0.2 part of methyl cellulose, 0.2 part of polyoxyethylene sorbitane fatty acid partial ester, 0.4 part of maleic acid/methyl vinyl ether copolymer, 300 parts of deionized water, 1.0 part of 3,5,5-trimethylhexanoyl peroxide, 2.0 parts of 2,2'-azobis-2,4-dimethylvaleronitrile and 1.0 part of potassium hydroxide. After deaeration, 100 parts of vinyl chloride was introduced, and the polymerization was started at 52° C. One hour after the starting of the polymerization, a mixture of 10 parts of vinylidene chloride and 10 parts of 2-hydroxypropyl methacrylate was continuously added in its entire amount before the pressure of the autoclave reached 4 kg/cm$_2$. When the pressure became 3 kg/cm$^2$, the unreacted vinyl chloride was recovered. The residue was dehydrated and dried to obtain a copolymer.

Thirty parts of this copolymer was mixed with 100 parts of dimethylformamide, 50 parts of deionized water, 3 parts of benzyl triethyl ammonium chloride and 5 parts of potassium hydrogen sulfate with stirring at 80° C. for 2 hours. Deionized water (400 parts) was added to the mixture to separate the resin. It was dried to give a final resin (I-G).

COMPARATIVE EXAMPLE 3

A resin (I-H) was produced by the same operation as in Example 1 except that isobutyl vinyl ether was used instead of the allyl glycidyl ether.

COMPARATIVE EXAMPLE 4

A resin (I-I) was prepared by operating in the same way as in Example 1 except that the amount of vinylidene chloride was changed to 100 parts.

The properties of the resins obtained in Examples 1 to 5 and Comparative Examples 1 to 4 are shown in Table 1 together with those of a commercial vinyl chloride/vinyl acetate/maleic acid terpolymer (I-J) and a commercial vinyl chloride/vinyl acetate/vinyl alcohol terpolymer (I-K). The amount of the hydroxyl groups in the resin was determined by infrared absorption spectroscopy. The amount of vinyl chloride was determined by measuring the amount of chlorine by burning. The amount of the strong acid groups was determined by elemental analysis and infrared absorption spectroscopy.

Magnetic paints and magnetic recording media were produced by using the resins I-A to I-K, and tested for their properties. The results are also tabulated. The testing methods were as follows:

(1) Solubility

A solution composed of 100 parts of the vinyl chloride copolymer, 200 parts of methyl ethyl ketone and 200 parts of toluene was prepared. The transparency of the solution was visually observed, and evaluated on a scale of O (excellent), Δ (good), and X (poor).

(2) Heat stability

The vinyl chloride copolymer (1.0 g) was taken into a 15 cc test tube, and its opening portion was stopped by an absorbent cotton holding Congo Red test paper. The test tube was placed in an oil bath at 150° C., and the time (minutes) which elapsed until the Congo Red test paper changed in color by generated HCl was measured.

(3) Dispersion stability

A mixture composed of 400 parts of a magnetic metallic iron powder, 100 parts of the vinyl chloride copolymer, 300 parts of methyl ethyl ketone, 300 parts of methyl isobutyl ketone and 300 parts of toluene was dispersed under high speed shear for 90 minutes. The resulting dispersion was taken into a sample bottle, and stored in a constant temperature bath at 25° C. The state of occurrence of a gel was observed. The occurrence of a gel was determined by taking out a portion of the dispersion on a glass plate, diluting it with about 5 times its amount of methyl ethyl ketone, and observing the dilution visually while stiring it with a glass rod. The amount of the gel was expressed on a scale of O (excellent), Δ (good) and X (poor).

(4) Gloss (1)

A mixture composed of 400 parts of a magnetic metallic iron powder, 70 parts of the vinyl chloride copolymer, 30 parts of a polyurethane resin (Nippolane 2304, a product of Nippon Polyurethane Industry Co., Ltd.), 300 parts of methyl ethyl ketone, 300 parts of methyl isobutyl ketone, 300 parts of toluene, and 2 parts of silicone oil was dispersed under high-speed shear for 90 minutes, and then 15 parts of polyisocyanate (Coronate L, a product of Nippon Polyurethane Industry Co., Ltd.) and 100 parts of cyclohexanone were added. The mixture was further dispersed for 90 minutes. The resulting magnetic coating composition (magnetic paint) was coated on a polyester film to a thickness of 5 micrometers, subjected to a magnetic field orientation treatment, and dried. The reflectance of the magnetic coated layer at a reflection angle of 60° was measured by a glossmeter.

(5) Gloss (2)

The reflectance was measured by the same method as in Gloss (1) above except that polyamide (Versamide 125, a product of General Mills, Inc.) was used instead of the polyisocyanate.

(6) Squareness ratio (Br/Bm)

A sample having a size of 12.5 mm ×50 mm was cut out from the magnetic coated layer used in the measurement of gloss, and the squareness ratio of the sample was measured by a magnetic characteristic measuring device.

(7) Durability

The magnetic coated layer used in the measurement of gloss was smoothed by a calender roll, and heat-treated at 65° C. for 65 hours. It was then kept in contact under a load of 100 g with a rotating drum having abrasive paper attached to its surface. The drum was rotated at a speed of 150 rpm, and the amount of the magnetic paint adhering to the abrasive paper at this time was visually observed and expressed on a scale of O (excellent), Δ (good) and X (poor).

(8) Running property

The force generated between the magnetic coated layer and the rotating drum was measured by a U gauge in an atmosphere kept at a temperature of 65° C. and a relative humidity of 80% by the same method as in the durability test. The result is expressed on a scale of O (excellent), Δ (good) and X (poor).

TABLE 1

|  | Example | | | | | Comparative Example | | | | | |
| --- | --- | --- | --- | --- | --- | --- | --- | --- | --- | --- | --- |
|  | 1 | 2 | 3 | 4 | 5 | 1 | 2 | 3 | 4 | 5 | 6 |
| Properties of the resin |  |  |  |  |  |  |  |  |  |  |  |
| Sample designation | I-A | I-B | I-D | I-E | I-G | I-C | I-F | I-H | I-I | I-J | I-K |
| Vinyl chloride (wt. %) | 91 | 91 | 78 | 78 | 72 | 91 | 79 | 90 | 40 | 86 | 91 |
| Strong acid groups (wt. %) | 1.0 | 0.7 | 2.0 | 1.0 | 1.8 | — | — | — | 1.0 | 0.8*[1] | — |
| Epoxy groups (wt. %) | 0.7 | 0.9 | 5.0 | 5.5 | 1.2 | 1.6 | 6.0 | — | 0.6 | — | 2.3*[2] |
| Degree of polymerization | 350 | 350 | 380 | 380 | 280 | 350 | 380 | 480 | 380 | 400 | 430 |
| Properties of the magnetic paint or the magnetic recording medium |  |  |  |  |  |  |  |  |  |  |  |
| Solubility |  |  |  |  |  |  |  |  |  |  |  |
| Heat stability (minutes) | 22 | 22 | 48 | 50 | 28 | 38 | >60 | 18 | 28 | 15 | 6 |
| Dispersion stability |  |  |  |  |  | The magnetic powder did not disperse uniformly, and a magnetic paint could not be |  |  | X | X | X |
| Gloss (1) (%) | 91 | 86 | — | — | 91 |  |  | 86 | 30 | 10 |
| Gloss (2) (%) | — | — | 120 | 120 | — |  |  |  |  |  |
| Squareness ratio | 0.82 | 0.81 | 0.83 | 0.83 | 0.82 |  |  | 0.81 | 0.68 | 0.66 |
| Durability |  |  |  |  |  |  |  | Δ | X | X |
| Running property |  |  |  |  | Δ |  |  | X | X | Δ |

TABLE 1-continued

|  | Example | | | | | Comparative Example | | | | | |
|---|---|---|---|---|---|---|---|---|---|---|---|
|  | 1 | 2 | 3 | 4 | 5 | 1 | 2 | 3 | 4 | 5 | 6 |
|  |  |  |  |  |  | obtained. |  |  |  |  |  |

*¹Carboxyl group
*²Hydroxyl group

[Examples of synthesizing the resin (II)]

EXAMPLE 6

An autoclave was charged with 300 parts of deionized water, 25 parts of allyl glycidyl ether, 5 parts of potassium persulfate, 2 parts of sodium dodecylbenzenesulfonate and 0.7 part of potassium hydroxide. After deaeration, 100 parts of vinyl chloride was introduced, and the polymerization was started at 42° C. As soon as the polymerization was started, 10 parts of acrylonitrile was continuously introduced into the autoclave. When the pressure of the autoclave reached 3 kg/cm², the temperature was raised to 80° C. While recovering the unreacted vinyl chloride, the reaction mixture was maintained at this temperature for 3 hours, then frozen and coagulated, washed with water, and dried to give a resin (II-A).

EXAMPLE 7

A resin (II-B) was prepared by operating in the same way as in Example 6 except that potassium perphosphate was used instead of potassium persulfate.

EXAMPLE 8

An autoclave was charged with 130 parts of deionized water, 120 parts of methanol, 0.6 part of methyl cellulose, 0.2 part of sodium laurylsulfate, 2.0 part of ammonium persulfate, 5 parts of vinyl acetate and 1.0 part of vinyl cyclohexene monoxide. After deaeration, 100 parts of vinyl chloride was introduced, and the temperature was raised to 58° C. One hour after the starting of the reaction, 10 parts of glycidyl methacrylate and 10 parts of 2-hydroxyethyl methacrylate were continuously introduced into the autoclave, and the introduction was completed before the pressure of the autoclave reached 3 kg/cm². Immediately then, the unreacted vinyl chloride was recovered. The liquid portion was removed, and the residue was washed with water and dried to give a resin (II-C).

COMPARATIVE EXAMPLE 7

A resin (II-D) was obtained by operating in the same way as in Example 6 except that 2,2'-azobisisobutyronitrile was used instead of potassium persulfate.

COMPARATIVE EXAMPLE 8

Example 6 was repeated by using vinyl acetate instead of allyl glycidyl ether. However, the rate of polymerization was extremely high, and the reaction temperature could not be maintained at 42° C. In addition, the pressure of the autoclave reached 3 kg/cm² when 4 parts of acrylonitrile was introduced. The polymerization reaction mixture was worked up by the same operation as in Example 6 to give a resin (II-E).

COMPARATIVE EXAMPLE 9

A resin (II-F) was prepared by operating in the same way as in Example 9 except that the amount of vinyl acetate charged was changed to 50 parts, the amount of vinyl chloride charged was changed to 55 parts, and the pressure of the autoclave at the end of the reaction was changed to 0.5 kg/cm².

The properties of the resins obtained in Examples 6 to 8 and Comparative Examples 7 to 9 were measured, and the characteristics of magnetic paints and magnetic recording media prepared by using the resins were measured and evaluated in the same way as described hereinabove. The results are shown in Table 2.

TABLE 2

|  | Example | | | Comparative Example | | |
|---|---|---|---|---|---|---|
|  | 6 | 7 | 8 | 7 | 8 | 9 |
| Properties of the resin |  |  |  |  |  |  |
| Sample designation | II-A | II-B | II-C | II-D | II-E | II-F |
| Vinyl chloride (wt. %) | 77 | 77 | 82 | 75 | 84 | 56 |
| Strong acid groups (wt. %) | 0.8 | 0.9 | 0.3 | — | — | 0.3 |
| Epoxy groups (wt. %) | 4.2 | 4.2 | 2.5 | 4.5 | — | 2.4 |
| Degree of polymerization | 260 | 260 | 370 | 260 | 840 | 210 |
| Properties of the magnetic paint or the magnetic recording medium |  |  |  |  |  |  |
| Solubility |  |  |  |  | Δ |  |
| Heat stability (minutes) | 55 | 55 | 42 | >60 | 19 | 40 |
| Dispersion stability |  |  |  |  | The magnetic powder did not disperse uniformly, and a magnetic paint could not be obtained. |  |
| Gloss (1) (%) | 96 | — | 96 | 89 |  | 80 |
| Gloss (2) (%) | — | 130 | — | 130 | — |  |
| Squareness ratio | 0.82 | 0.84 | 0.82 | 0.84 | 0.81 | 0.80 |
| Durability |  |  |  |  |  |  |
| Running property |  |  |  |  |  | X |

[Examples of synthesizing the resin (III)]

EXAMPLE 9

An autoclave was charged with 180 parts of acetone, 2 parts of lauroyl peroxide and 10 parts of vinyl acetate. After deaeration, 100 parts of vinyl chloride was charged, and the polymerization was started at 55° C. Immediately after the starting of the polymerization, 5 parts of sodium styrenesulfonate, 10 parts of glycidyl methacrylate and 85 parts of methanol were continuously introduced into the autoclave. One hour after all of them were introduced, the unreacted vinyl chloride was recovered under reduced pressure. The polymer solution was mixed with 500 parts of deionized water to separate the resin. It was dried to give a final resin (III-A).

EXAMPLE 10

A resin (III-B) was prepared by operating in the same way as in Example 9 except that methacrylic acid-propyl 3-chloro-2-phosphate was used instead of sodium styrenesulfonate.

COMPARATIVE EXAMPLE 13

A resin (III-H) having a strong acid group content of 0.05% by weight was prepared by operating in the same way as in Example 11 except that deionized water was used instead of methanol.

The properties of the resins obtained in Examples 9 to 12 and Comparative Examples 10 to 13 were measured, and the characteristics of magnetic paints and magnetic recording media prepared by using the resins were measured and evaluated in the same way as described hereinabove. The results are shown in Table 3.

TABLE 3

|  | Example | | | | Comparative Example | | | |
| --- | --- | --- | --- | --- | --- | --- | --- | --- |
|  | 9 | 10 | 11 | 12 | 10 | 11 | 12 | 13 |
| Properties of the resin | | | | | | | | |
| Sample designation | III-A | III-B | III-C | III-D | III-E | III-F | III-G | III-H |
| Vinyl chloride (wt. %) | 89 | 89 | 92 | 93 | 88 | 89 | 58 | 94 |
| Strong acid groups (wt. %) | 1.4 | 1.4 | 0.5 | 0.3 | — | 1.4 | 0.5 | 0.05 |
| Epoxy groups (wt. %) | 2.0 | 2.0 | 1.2 | 1.1 | 2.0 | — | 8.5 | 1.0 |
| Degree of polymerization | 380 | 360 | 340 | 350 | 370 | 380 | 240 | 520 |
| Properties of the magnetic paint or the magnetic recording medium | | | | | | | | |
| Solubility | | | | | | | | |
| Heat stability (minutes) | 40 | 40 | 34 | 35 | 45 | 18 | >60 | 45 |
| Dispersion stability | | | | | The magnetic powder did not disperse uniformly, and a magnetic paint could not be obtained. | | | X |
| Gloss (1) (%) | 95 | — | 91 | — | | 96 | 87 | 10 |
| Gloss (2) (%) | — | 105 | — | 130 | | — | — | — |
| Squareness ratio | 0.82 | 0.83 | 0.81 | 0.84 | | 0.82 | 0.80 | 0.66 |
| Durability | | | | | | Δ | Δ | X |
| Running property | | | | | | X | X | Δ |

EXAMPLE 11

An autoclave was charged with 250 parts of methanol, 0.5 part of ammonium persulfate, 0.6 part of methyl cellulose, 0.2 part of sodium laurylsulfate, 4 parts of ammonium 3-allyloxy-2-hydroxypropanesulfonate and 10 parts of glycidyl ethylmaleate. After deaeration, 100 parts of vinyl chloride was introduced, and the temperature was raised to 50° C. The polymerization was thus started. When the pressure of the autoclave reached 2 kg/cm², the unreacted vinyl chloride was recovered. The liquid portion was removed, and the residue was washed with water and dried to give a resin (III-C).

EXAMPLE 12

A resin (III-D) was prepared by operating in the same way as in Example 11 except that ammonium 3-allyloxypropanesulfate was used instead of ammonium 3-allyoxypropanesulfonate.

COMPARATIVE EXAMPLE 10

A resin (III-E) was prepared by operating in the same way as in Example 9 except that styrene was used instead of sodium styrenesulfonate.

COMPARATIVE EXAMPLE 11

A resin (III-F) was prepared in the same way as in Example 9 except that propyl methacrylate was used instead of glycidyl methacrylate.

COMPARATIVE EXAMPLE 12

A resin (III-G) was prepared by operating in the same way as in Example 11 except that the amount of glycidyl ethylmaleate was changed to 50 parts, the amount of vinyl chloride was changed to 60 parts, and the pressure of the autoclave at the end of the reaction was changed to 0.5 kg/cm².

[Examples of synthesizing the resin (IV)]

EXAMPLE 13

Allyl glycidyl ether (15 parts), 2 parts of sodium bisulfite and 50 parts of deionized water were stirred in an Erlenmeyer flask at 50° C. In two hours, the mixture turned pale yellow, and the amount of the liquid layer became much smaller than that before the reaction. An autoclave was charged with the resulting mixture, 5 parts of vinyl acetate, 3 parts of sodium laurylsulfate, 1 part of potassium persulfate and 150 parts of deionized water. After deaeration, 100 parts of vinyl chloride was added, and the polymerization was started at 54° C. When the pressure of the autoclave reached 5 kg/cm², the unreacted vinyl chloride was recovered, and a dispersion of the copolymer was obtained. It was frozen and coagulated, thoroughly washed with warm water until no bubble formed in the washing water, and then dried to give a resin (IV-A).

EXAMPLE 14

A resin (IV-B) was prepared by operating in the same way as in Example 13 except that potassium hydrogen sulfate was used instead of sodium bisulfite.

EXAMPLE 15

A glass autoclave was charged with 20 parts of glycidyl methacrylate, 3 parts of diammonium hydrogen phosphate and 50 parts of deionized water. After deaeration, these materials were mixed at 50° C. for 2 hours. A separate stainless steel autoclave was charged with 3 parts of 3-buten-1-ol, 1 part of azobisisobutyronitrile, 0.6 part of methyl cellulose, 0.2 part of polyoxyethylene lauryl ether and 200 parts of methanol. After deaeration, 100 parts of vinyl chloride was added, and the polymerization was started at 53° C. At the same time, the mixture in the glass autoclave was continuously introduced into the stainless autoclave. The introduction was completed before the pressure of the stainless steel autoclave reached 5 kg/cm². When the pressure went down to 3 kg/cm², the unreacted vinyl chloride was recovered. The liquid portion was removed, and the residue was washed to give a resin (IV-C).

EXAMPLE 16

A resin (IV-D) was prepared by operating in the same way as in Example 15 except that sodium of taurine was used instead of diammonium hydrogen phosphate.

COMPARATIVE EXAMPLE 14

A resin (IV-E) was prepared by operating in the same way as in Example 13 except that the amount of sodium bisulfite was increased to 15 parts.

COMPARATIVE EXAMPLE 15

A resin (IV-F) was prepared by operating in the same way as in Example 13 except that the amount of vinyl acetate was changed to 50 parts and the amount of vinyl chloride was changed to 65 parts.

COMPARATIVE EXAMPLE 16

A resin (IV-G) was prepared by operating in the same way as in Example 15 except that n-propyl methacrylate was added instead of glycidyl methacrylate.

COMPARATIVE EXAMPLE 17

A resin (IV-H) was prepared by operating in the same way as in Example 15 except that diammonium hydrogen phosphate was not used.

The properties of the resins obtained in Examples 13 to 16 and Comparative Examples 14 to 17 were measured, and the characteristics of magnetic paints and magnetic recording media prepared by using the resins were measured and evaluated in the same way as described hereinabove. The results are shown in Table 4.

TABLE 4

|  | Example | | | | Comparative Example | | | |
|---|---|---|---|---|---|---|---|---|
|  | 13 | 14 | 15 | 16 | 14 | 15 | 16 | 17 |
| Properties of the resin | | | | | | | | |
| Sample designation | IV-A | IV-B | IV-C | IV-D | IV-E | IV-F | IV-G | IV-H |
| Vinyl chloride (wt. %) | 82 | 82 | 84 | 85 | 80 | 49 | 83 | 83 |
| Strong acid groups (wt. %) | 1.2 | 1.1 | 1.3 | 0.8 | 6.2 | 1.2 | — | — |
| Epoxy groups (wt.%) | 2.3 | 2.3 | 2.4 | 2.0 | 0.2 | 2.3 | — | 2.7 |
| Degree of polymerization | 370 | 390 | 390 | 410 | 410 | 340 | 350 | 390 |
| Properties of the magnetic paint or the magnetic recording medium | | | | | | | | |
| Solubility | | | | | Δ | | | |
| Heat stability (minutes) | 45 | 45 | 49 | 40 | 10 | 30 | 15 | >60 |
| Dispersion stability | | | | | The magnetic powder did not disperse uniformly, and a magnetic paint could not be obtained. | | The magnetic powder did not disperse uniformly, and a magnetic paint could not be obtained. | |
| Gloss (1) (%) | 95 | — | 98 | — | | 78 | | |
| Gloss (2) (%) | — | 125 | — | 100 | | — | | |
| Squareness ratio | 0.83 | 0.84 | 0.84 | 0.82 | | 0.79 | | |
| Durability | | | | | | X | | |
| Running property | | | | | | X | | |

What is claimed is:

1. A magnetic paint for magnetic recording media, said paint comprising a magnetic powder and as a binder therefore, a copolymer resin containing 0.5 to 10% by weight of epoxy groups and 0.1 to 4.0% by weight of sulfur- or phosphorus-containing strong acid groups and having a vinyl chloride unit content of at least 60% by weight and an average degree of polymerization of from 100 to 900.

2. A magnetic paint for magnetic recording media, said paint comprising a magnetic powder and as a binder therefor, a copolymer resin containing 0.5 to 10% by weight of epoxy groups and 0.1 to 4.0% by weight of sulfur- or phosphorus-containing strong acid groups and having a vinylchloride unit content of at least 60% by weight and an average degree of polymerization of from 100 to 900, said copolymer resin being selected from the group consisting of (1) an addition-reaction product of a copolymer having a vinyl chloride unit content of at least 60% by weight with an alkali metal salt or ammonium salt of a sulfur- or phosphorus-containing strong acid, said copolymer being obtained by copolymerizing vinyl chloride, a monomer having an epoxy group and as required, another monomer copolymerizable with these monomers, (2) a product obtained by polymerizing vinyl chloride and a monomer having an epoxy group and as required, another monomer copolymerizable with these monomers in the presence of a radical initiator having a sulfur- or phosphorus-containing strong acid group, (3) a product obtained by copolymerizing vinyl chloride, a monomer having an epoxy group, and a monomer having a group derived from an alkali metal salt or ammonium salt of a sulfur- or phosphorus-containing strong acid, and as required, another monomer copolymerizable with these monmers, and (4) a product obtained by copolymerizing a reaction mixture resulting from the addition reaction of a monomer having an epoxy group with an alkali metal salt or ammonium salt of a sulfur- or phosphorus-containing strong acid, and vinyl chloride and as required another monomer copolymerizable with them.

3. The magnetic paint of claim 1 wherein the copolymer resin is an addition-reaction product of a copolymer having a vinyl chloride unit content of at least 60% by weight with an alkali metal salt or ammonium salt of a sulfur- or phosphorus-containing strong acid, said copolymer being obtained by copolymerizing vinyl chloride, a monomer having an epoxy group and as required, another monomer copolymerizable with these monomers.

4. The magnetic paint of claim 3 wherein the monomer having an epoxy group is selected from the group consisting of glycidyl ethers of unsaturated alcohols, glycidyl esters of unsaturated acids and epoxide olefins.

5. The magnetic paint of claim 3 wherein the copolymerization is carried out at 35° to 120° C. by solution polymerization, or by suspension polymerization using a lower alcohol as a polymerization medium.

6. The magnetic paint of claim 3 wherein the alkali metal salt or ammonium salt of a sulfur- or phosphorus-containing strong acid is selected from the group consisting of sulfurous acid salts, sulfuric acid hydrogen salts, phosphoric acid hydrogen salts, phosphorous acid salts, aminosulfonic acid salts and aminosulfuric acid salts.

7. The magnetic paint of claim 3 wherein the addition reaction is carried out at 40° to 90° C. in an aqueous medium or a water-containing organic solvent medium.

8. The magnetic paint of claim 1 wherein the copolymer resin is obtained by polymerizing vinyl chloride and a monomer having an epoxy group and as required, another monomer copolymerizable with these monomers in the presence of a radical initiator having a sulfur- or phosphorus-containing strong acid group.

9. The magnetic paint of claim 8 wherein the monomer having an epoxy group is selected from the group consisting of glycidyl ethers of unsaturated alcohols, glycidyl esters of unsaturated acids and epoxide olefins.

10. The magnetic paint of claim 8 wherein the radical initiator having a sulfur- or phosphorus-containing strong acid group is selected from the group consisting of alkali metal salts or an ammonium salt of persulfuric acid and alkali metal salts or an ammonium salt of perphosphoric acid.

11. The magnetic paint of claim 1 wherein the copolymer resin is obtained by copolymerizing vinyl chloride, a monomer having an epoxy group, and a monomer having a group derived from an alkali metal salt or ammonium salt of a sulfur- or phosphorus-containing strong acid, and as required, another monomer copolymerizable with these monomers.

12. The magnetic paint of claim 11 wherein the monomer having an epoxy group is selected from the group consisting of glycidyl ethers of unsaturated alcohols, glycidyl esters of unsaturated acids and epoxide olefins.

13. The magnetic paint of claim 11 wherein the monomer having a group derived from an alkali metal salt or ammonium salt of a sulfur- or phosphorus-containing strong acid is a monomer having a group derived from a sulfonic acid salt, a sulfuric acid salt, a phosphoric acid salt or a phosphonic acid salt.

14. The magnetic paint of claim 11 wherein the copolymerization is carried out at 35° to 80° C. by solution polymerization, or by suspension polymerization using a polymerization medium at least containing a lower alcohol.

15. The magnetic paint of claim 1 wherein the copolymer resin is obtained by copolymerizing a reaction mixture resulting from the addition reaction of a monomer haiving an epoxy group with an alkali metal salt or ammonium salt of a sulfur- or phosphorus-containing strong acid, and vinyl chloride and as required another monomer copolymerizable with them.

16. The magnetic paint of claim 15 wherein the monomer having an epoxy group is selected from the group consisting of glycidyl ethers of unsaturated alcohols, glycidyl esters of unsaturated acids and epoxide olefins.

17. The magnetic paint of claim 15 wherein the alkali metal salt or ammonium salt of a sulfur- or phosphorus-containing strong acid is selected from the group consisting of sulfurous acid salts, sulfuric acid hydrogen salts, phosphoric acid hydrogen salts, phosphorous acid salts, aminosulfonic acid salts and aminosulfuric acid salts.

18. The magnetic paint of claim 15 wherein the addition reaction is carried out at 20° to 120° C. in an aqueous medium or a water-containing organic solvent medium.

19. The magnetic paint of claim 15 wherein the polymerization is carried out at 35° to 80° C. by solution polymerization, or by suspension polymerization using a polymerization medium at least containing a lower alcohol.

20. The magnetic paint of claim 8 wherein the polymerization is carried out at 35° to 80° C. by emulsion polymerization, solution polymerization, or suspension polymerization using a lower alcohol as a polymerization medium.

21. The magnetic paint of claim 2 further comprising a flexible polymeric material.

22. The magnetic paint of claim 21 wherein the flexible polymeric material is selected from the group consisting of polyurethane resin, polyester resin and acrylonitrile-butadiene copolymer.

23. The magnetic paint of claim 1 further comprising a flexible polymeric material.

24. The magnetic paint of claim 23 wherein the flexible polymeric material is selected from the group consisting of polyurethane resin, polyester resin and acrylonitrilebutadiene copolymer.

* * * * *